United States Patent
Raghavan et al.

(10) Patent No.: US 7,519,921 B2
(45) Date of Patent: Apr. 14, 2009

(54) METHOD AND SYSTEM FOR SELECTING A DYNAMIC OBJECT IN A GRAPHICAL USER INTERFACE

(75) Inventors: Bharathi Raghavan, San Jose, CA (US); Nagappan Subramoni, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 727 days.

(21) Appl. No.: 11/123,506

(22) Filed: May 5, 2005

(65) Prior Publication Data

US 2006/0253798 A1 Nov. 9, 2006

(51) Int. Cl.
*G06F 3/048* (2006.01)
(52) U.S. Cl. .................. 715/814; 715/825; 715/827; 717/125
(58) Field of Classification Search .............. 715/764, 715/812–827; 714/37, 38, 46; 717/124–127
See application file for complete search history.

(56) References Cited

U.S. PATENT DOCUMENTS

| 5,781,720 | A | 7/1998 | Parker |
| 2004/0049630 | A1* | 3/2004 | Stark ........................ 711/108 |
| 2004/0249827 | A1* | 12/2004 | Bhogal et al. .............. 707/100 |
| 2005/0050083 | A1* | 3/2005 | Jin et al. .................... 707/102 |
| 2005/0228772 | A1* | 10/2005 | Faunce et al. ................ 707/2 |

\* cited by examiner

*Primary Examiner*—Ba Huynh
(74) *Attorney, Agent, or Firm*—Trellis IP Law Group, PC

(57) ABSTRACT

A method and system for selecting a dynamic object in a Graphical User Interface (GUI), is provided. The GUI is represented by a matrix comprising a plurality of objects and a plurality of data values associated with each object. The method includes selecting a first row that includes a first non null data value in a textually represented matrix derived from the matrix; selecting a row in the textually represented matrix based on a predefined input; calculating the difference in the number of rows between the selected row and the row that includes the first non null data value; selecting a least index key from a plurality of index keys, with each index key identifying each of a plurality of selected objects in the matrix; and locating an object from the plurality of selected objects.

14 Claims, 9 Drawing Sheets

| | Fields / Objects | Field 1 <description> | Field 2 <description> | Field 3 <description> | Field n <description> |
|---|---|---|---|---|---|
| Row 1 | | | | | |
| Row 2 | | Null | Null | Null | Null |
| Row 3 | | .. | .. | .. | .. |
| Row 4 | | .. | .. | .. | .. |
| Row 5 | GuiTestObject | ITestDataTable[R,1] | ITestDataTable[R,2] | ITestDataTable[R,3] | ITestDataTable[R,n] |
| Row 6 | .. | .. | .. | .. | .. |
| Row 7 | .. | .. | .. | .. | .. |
| Row 8 | GuiTestObject | ITestDataTable[m,1] | ITestDataTable[m,2] | ITestDataTable[m,3] | ITestDataTable[m,n] |

302

| | Index | | | | |
|---|---|---|---|---|---|
| Row 1 | Index | Cell-text | Cell-text | Cell-text | Cell-text |
| Row 2 | Check box/radio button | Cell-text | Cell-text | Cell-text | Cell-text |
| Row 3 | . | .. | .. | .. | .. |
| Row 4 | .. | .. | .. | .. | .. |
| Row 5 | Check box/radio button | Cell-text | Cell-text | Cell-text | Cell-text |

| Objects | Index Keys |
|---------|------------|
| O(0) | C(O(0))=1 |
| O(1) | C(O(1)) =2 |
| O(2) | C(O(1)) =3 |
| O(3) | C(O(3)) =4 |
| O(4) | C(O(4)) = 5 |

600

|   |   |   |   |   |   |
|---|---|---|---|---|---|
| | 706 | 712 | 708 | 714 | 710 |
| 1 | <GTO Optional 'X'> | <Null> | Location | <Null> | Product |
| 2 | <Null> | <Null> | <Null> | <Null> | <Null> |
| 3 | <GTO-Index 'X+1'> | <Null> | San Jose | <Null> | Product 1 |
| 4 | <GTO-Index 'X+2'> | <Null> | Santa Clara | <Null> | Product 1 |
| 5 | <Null> | <Null> | <Null> | <Null> | <Null> |
| 6 | <GTO-Index 'X+3'> | <Null> | San Jose | <Null> | Product 2 |
| 7 | <GTO-Index 'X+4'> | <Null> | Santa Clara | <Null> | Product 2 |
| 8 | <GTO-Index 'X+5'> | <Null> | San Jose | <Null> | Product 3 |

702

| | | | |
|---|---|---|---|
| 1 | <GTO Optional 'X'> O[X+0] | Location R[1,3] | Name R[1,4] |
| 3 | <GTO Optional 'X'> O[X+1] | San Jose R[2,3] | Product 1 R[2,4] |
| 4 | <GTO Optional 'X'> O[X+2] | Santa Clara R[3,3] | Product 1 R[3,4] |
| 6 | <GTO Optional 'X'> O[X+3] | San Jose R[4,3] | Product 2 R[4,4] |
| 7 | <GTO Optional 'X'> O[X+4] | Santa Clara R[5,3] | Product 2 R[5,4] |
| 6 | <GTO Optional 'X'> O[X+5] | San Jose R[6,3] | Product 3 R[6,4] |

METHOD AND SYSTEM FOR SELECTING A DYNAMIC OBJECT IN A GRAPHICAL USER INTERFACE

BACKGROUND OF THE INVENTION

1. Field of Invention

Embodiments of the present invention relate in general to the field of graphical user interfaces (GUI). More specifically, embodiments of this invention relate to automating GUI testing.

2. Description of the Background Art

Testing of Graphical User Interfaces (GUI) includes locating an object, selecting it and performing an action on it. Testing may be carried out to check errors in the GUI, such as data invalidation, incorrect field defaults, incorrect search criteria, and so forth.

A widely used testing technique is the point and click approach. However, this approach may not be effective in the case of dynamic objects since these objects are randomly created by application data and are unknown until runtime. Further, the window in which a particular object will appear is also undetermined until runtime.

Another conventional technique of GUI testing is script-based automated testing, which performs actions based on a fixed script. However, the script needs to be updated each time the objects within a window change.

GUI testing can also be performed by an object based testing, which carries out actions for objects present within a window. However, the conventional object-based testing does not deal with objects that are dynamically generated by application data.

BRIEF DESCRIPTION OF THE DRAWINGS

FIG. 3 represents exemplary textual representation matrices, in accordance with various embodiments of the invention.

FIG. 7 illustrates matrix representations of an exemplary set of objects in a GUI, in accordance with an embodiment of the invention.

DETAILED DESCRIPTION OF EMBODIMENTS OF THE INVENTION

The embodiments of the invention provide a method, system, apparatus and machine-readable medium for software testing using Graphical User Interface (GUI) automation. In various embodiments of the invention, a generic method for selection mechanisms of dynamic objects in a GUI is provided. According to an embodiment of the invention, a matrix comprising objects and their associated data values may represent the GUI. An object may be selected according to a predefined input entered by a user, wherein the predefined input corresponds to information required to locate the object.

Figure 1:
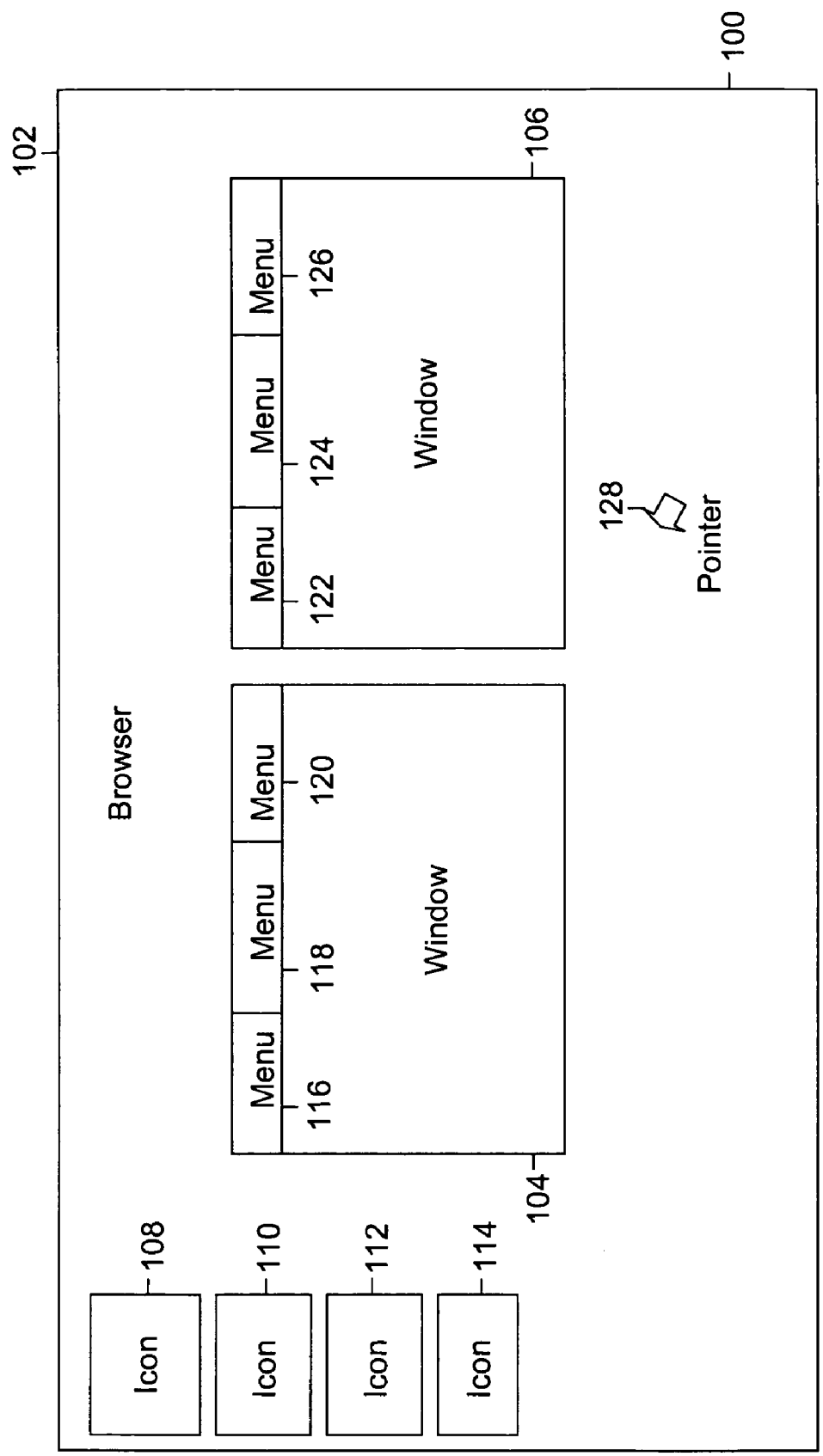
FIG. 1 illustrates a block diagram of an exemplary Graphical User Interface (GUI), in accordance with various embodiments of the invention.

FIG. 1 illustrates a block diagram of an exemplary GUI, in accordance with various embodiments of the invention. A GUI 100 includes a browser 102, a window 104, a window 106 and a set of icons. The set of icons include one or more icons, for example an icon 108, an icon 110, an icon 112 and an icon 114. Additionally, window 104 includes one or more menus, for example a menu 116, a menu 118, and a menu 120, each of which serves to provide access to applications. Similarly, window 106 includes a menu 122, a menu 124, and a menu 126. A pointer 128 is also shown that provides means to activate the various elements in GUI 100. In various embodiments of the invention, icons 108 to 114 and menus 116 to 126 represent objects of GUI 100.

Figure 2:
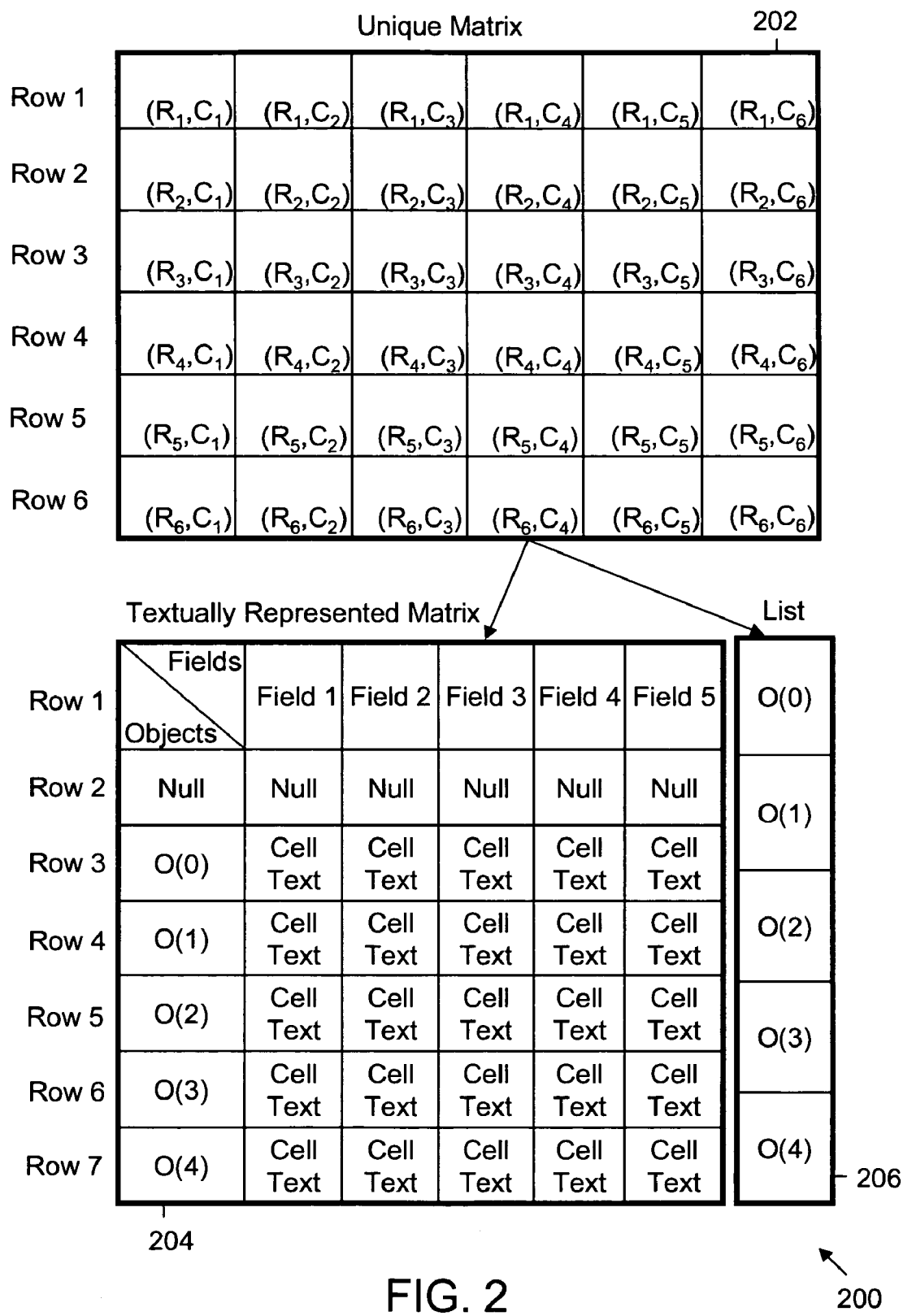
FIG. 2 illustrates exemplary matrix representations of objects in a GUI, in accordance with various embodiments of the invention.

FIG. 2 illustrates exemplary matrix representations of objects in GUI 100 in accordance with various embodiments of the invention. A matrix 202 represents a plurality of objects and a plurality of data values associated with each object included in GUI 100. In accordance with an embodiment of the invention, a textually represented matrix 204 and a list 206 are generated from matrix 202. In various embodiments of the invention, list 206 is a one-dimensional array of all the objects in matrix 202.

In an exemplary embodiment, matrix 202 includes five objects (Object O (0) to Object O(4)). Each object O(i) is associated with a plurality of data values. The first column stores the objects and the subsequent columns store the data values associated with each object. The data values are stored corresponding to the fields depicted by the subsequent columns. A particular element in matrix 202 is referred to as (Rx,Cy), wherein x may vary from one to m and y may vary from one to n, where m represents the number of rows and n represents the number of columns of matrix 202. Each object in matrix 202 is associated to a type and a class index that serves to uniquely identify an object. Examples of the type of an object can be a checkbox, a radio button, a list box, a drop down menu and the like.

Textually represented matrix 204 is a textual representation of objects and the associated plurality of data values. Textually represented matrix 204 includes N columns and M rows. An object is selected from textually represented matrix 204 based on the predefined input. In various embodiments of the invention, the predefined input includes numerical or textual data values that are used to locate an object.

In various embodiments of the invention, textually represented matrix 204 includes objects associated with a type identical to the type of an object described in the predefined input. For example, objects O(0), O(1), O(2), O(3), and O(4) belonging to a type defined in the predefined input are selected from matrix 202 and are included in list 206. In various embodiments of the invention, textually represented matrix 204 may include at least one row with null values such as the second row shown in textually represented matrix 204 in FIG. 2.

List 206 includes all the objects represented by matrix 202. List 206 is traversed to enable selection of objects associated with a type identical to the type of the object described in the predefined input. Each selected object along with the associated index key is then stored in a database. The class index of an object is used as an index key when a selected object is stored in the database. The database is described in detail with reference to FIG. 8.

FIG. 3 represents an exemplary textually represented matrix 302 and an exemplary textually represented matrix 304, in accordance with various embodiments of the invention. In various embodiments of the invention, textually represented matrix 302 can be a representation by a software tool such as an XDE Tester® (also known as IBM® Rational® Functional). XDE Tester® provides means for extracting data from textually represented matrix 302 or textually represented matrix 304. In various embodiments, each object or selection mechanism is represented as a GUITestObject® as shown in textually represented matrix 302. The objects to be stored in the database are selected using a corresponding index key associated with each object. An exemplary index key is further described in the example below.

In various embodiments of the invention, matrix 302 is represented as a StatelessGuiSubitemTestObject in the XDE Tester® tool. StatelessGuiSubitemTestObject is a top level object on which XDE tester® can store objects of a GUI and the textual representation of objects. Using this StatelessGuiSubitemTestObject, all other objects can be extracted. As shown in textually represented matrix 302 in FIG. 3, the first column (column one) stores objects, while the remaining columns (column two to column N) represent the data values associated with each object in column one. In matrix 302, the data values start from the fifth row.

In another embodiment, matrix 304 is an exemplary representation of matrix 302. Each object in matrix 304 may be a checkbox, a list box, a drop down menu or a radio button, each of which belong to a type of object specified by GUITestObject® in the XDE Tester® tool. The data values of each object can be in text or numeric form.

Figure 4:
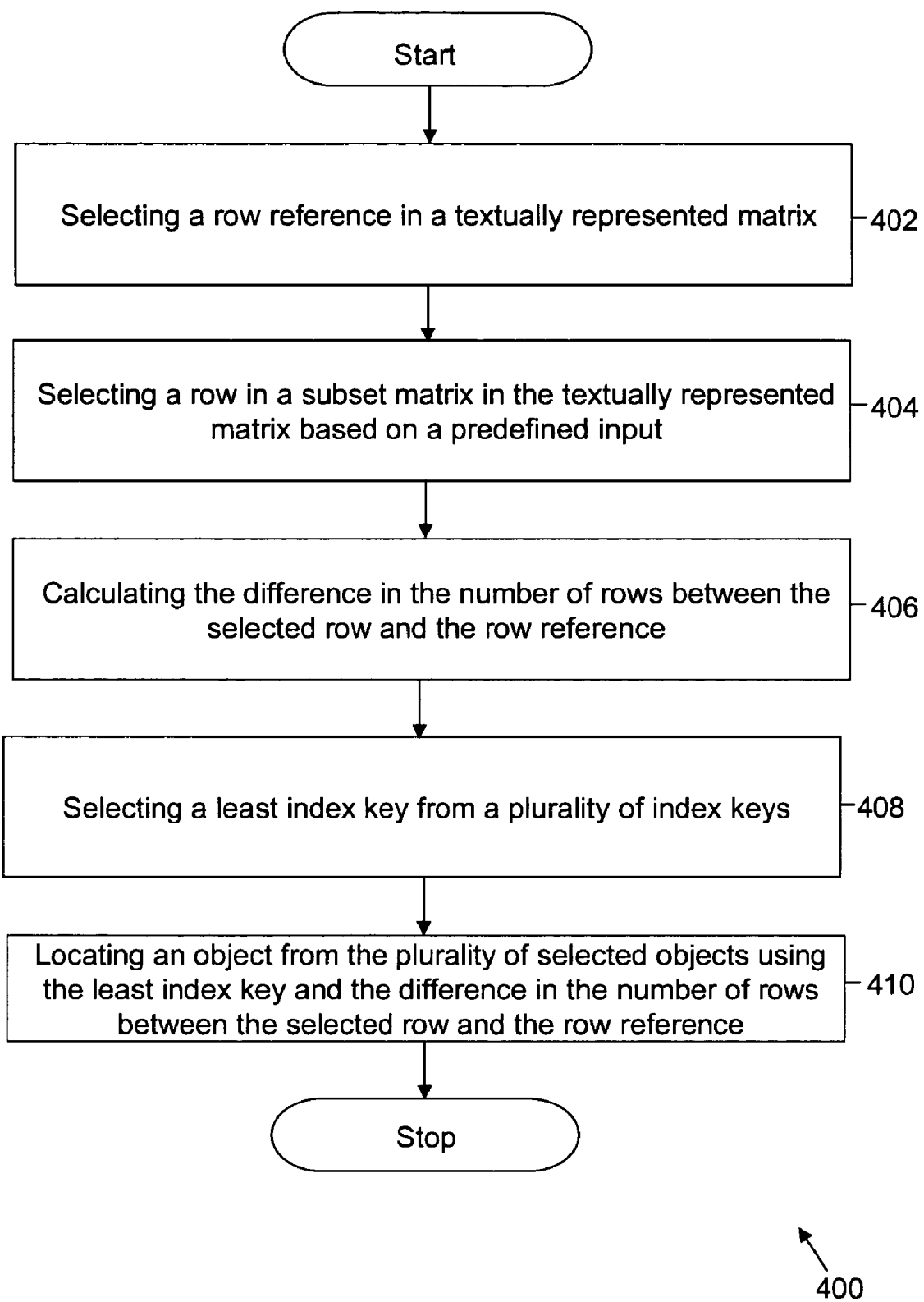
FIG. 4 illustrates a flowchart for locating an object in a GUI, in accordance with various embodiments of the invention.

FIG. 4 illustrates a flowchart 400 for locating an object in GUI 100 according to various embodiments of the invention. At step 402, a row reference 'Rr' is selected from textually represented matrix 204 by identifying a row that includes a first non-null data value in textually represented matrix 204. Computing the row reference 'Rr' confirms that textually represented matrix 204 includes data.

Functionally, the process of determining the row reference 'Rr' may be described as: (Rx, Cy) {x|1 ... M, y|1 ... N} if (Rx, Cy) !=NULL, Rr=x In the expression given above, variable x varies from one to M, in order to traverse through each row of textually represented matrix 204. When a row, which includes the first non-null data value, is encountered, Rr is assigned the value of x.

Alternatively, the relation may be expressed as follows: row reference 'Rr'=row num i, where data in matrix[Ri, Cj]!=null, j=1 ... N, for each i=1 ... M At step 404, the row reference 'Rr' is used as a starting row of a subset matrix in textually represented matrix 204. The subset matrix is searched for a selected row 'Rj', whose associated plurality of data values is identical to the data values specified for an object in a predefined input 'D'. In various embodiments of the invention, the predefined input 'D' is in the form of textual or numeric data, which could be a string or an array of strings. Functionally, the process of determining the selected row 'Rj' can be described as: Rx{x|Rr ... M} if D(Rx)=D, Rj=x. In the expression, x may vary from one to M, and stores the row number of the selected row 'Rj'. The value of x is then assigned to Rj.

At step 406, the difference in the number of rows between the selected row 'Rj' and the row reference 'Rr' is calculated. This difference is stored as a reference index 'Ri', i.e., Ri=Rj−Rr. Functionally, the relation may be expressed as follows:

Reference index 'Ri'=Row number of desired object (matching the user data input [Ka], a=1 ... M, with data (matrix[Ri, Cj]j=1 ... N for each i=1 ... M))Rj—row reference 'Rr', wherein the row number of desired object ( ) is a function that determines the row number of the selected row 'Rj', user data input [Ka], a=1 ... M refers to the predefined input 'D', Data( ) is a function that compares the predefined input 'D' with the data included in the rows of the subset matrix, wherein the subset matrix starts from the row reference 'Rr'. The expression thus calculates the difference between the selected row 'Rj' and the row reference 'Rr'.

At step 408, a least index key 'lk' is selected from a plurality of index keys. Each index key is associated with a selected object, and is generated using the class index of the selected object, during runtime. Objects are selected from list 206, based on the predefined input as has been described with reference to FIG. 2. The selected objects associated with a type, identical to the type of the object described in the predefined input 'D', are subsequently stored in the database along with the index key associated with each selected object. The database storing the plurality of selected objects is described in detail with reference to FIG. 6.

The index key of the first selected object to be stored in the database is assigned the least index key 'lk'. The index key of every subsequent object selected from list 206 is compared with the least index key 'lk'. The least index key 'lk' is assigned the lesser of the value among lk and the index key of every subsequently selected object. Following this process iteratively for each subsequently selected object, ensures that the least index key 'lk' is assigned the least of the plurality of index keys in the database. Functionally, the least index key 'lk' may be found as least index key 'lk'=least key of storedobjects [keyi, valuej], i=row reference ... m, j=1 ... n.

The above expression indicates that the least index key 'lk' is chosen from the plurality of index keys associated with the selected objects in the database. The objects stored in the database correspond to the elements stored in the subset matrix of textually represented matrix 204. The process of determining the least index key 'lk' is described in detail with reference to FIG. 5.

At step 410, an object is located from the plurality of selected objects using the least index key 'lk' and the reference index 'Ri'. In an embodiment of the invention, a unique index key 'Ci' is calculated to locate the object by adding the least index key 'lk' to the reference index 'Ri'. Algebraically, Ci=Ri+lk.

Thereafter, the unique index key 'Ci' is compared with each of the plurality of index keys corresponding to the objects in the database. An object is identified from the database, whose associated index key is identical to the unique index key 'Ci'. Functionally, the relation may be expressed as follows: O(i)=H(Ci), wherein H(Ci) denotes a function that retrieves the object with index key as Ci from the database.

In another embodiment of the invention, the relation may be expressed as: Object=Value (Selected objects (unique index key)), where Object is assigned the value of the object with an index key which is identical to the unique index key, wherein the unique index key has already been selected from the plurality of index keys, each of which is associated with a selected object.

A complete formula to locate an object in GUI 100 may be represented as: Object=Value (Selected objects (index(matrix[Ri, Cj=1 ... N]−matrix[Ri ... M, Cj ... n for each i]≠null)+index(least key(storedobjects[keyp ... m, valuep ... m]))) 'Object' therefore stores the value of the object identified from the database using the formulae described above.

A user may select an object by various selection mechanisms such as a drop down list, a list selection, a tree selection, a check box, a radio button and so forth. The selection mechanisms also serve to categorize the objects into various types. For example, an object of a 'drop down list' type displays its sub objects in a drop down menu, whereas an object of a 'tree selection' type displays its sub objects in a tree structure.

Figure 5A:
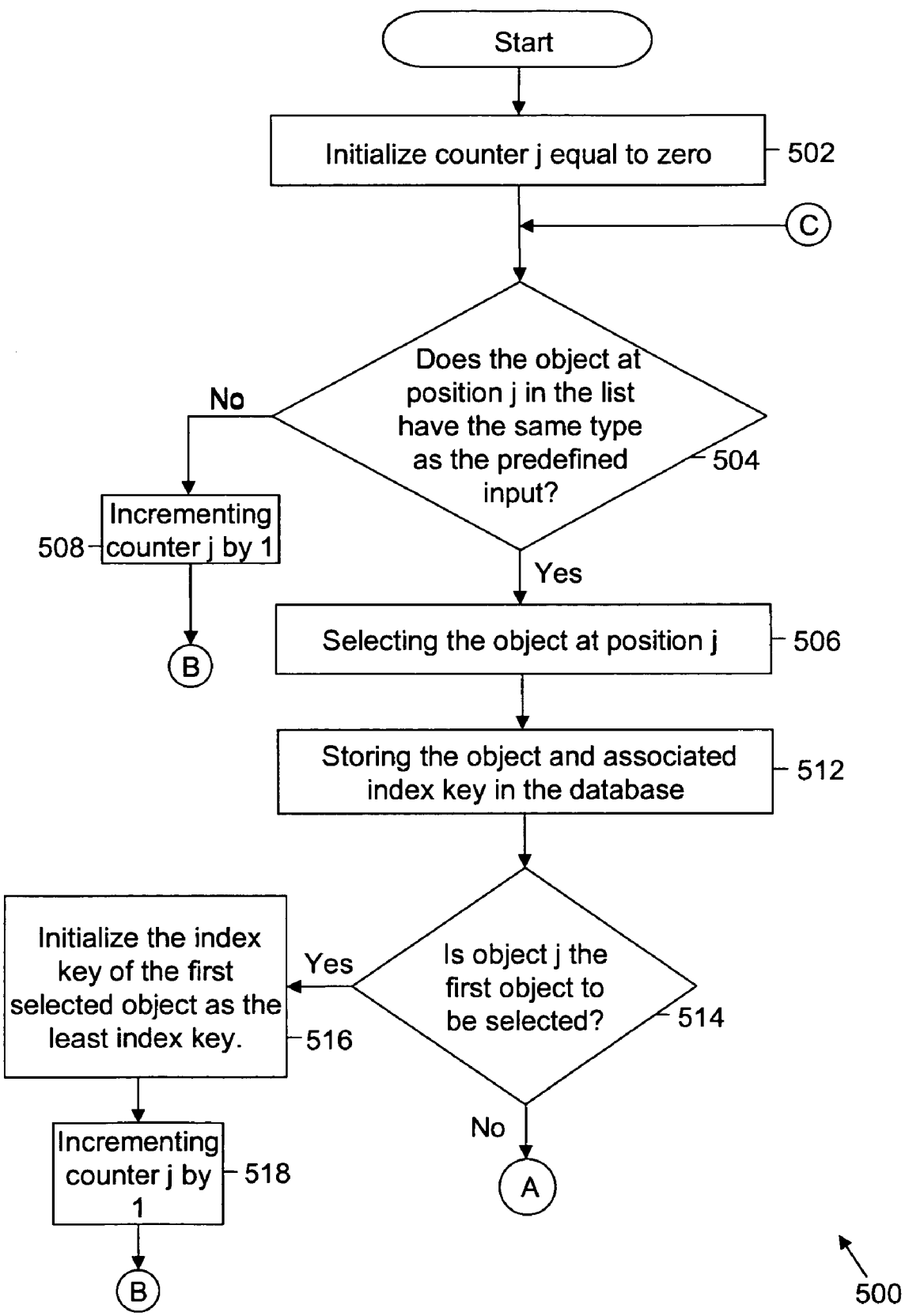
FIGS. 5a and 5b are flowcharts illustrating the process of selecting a least index key, in accordance with various embodiments of the invention.
Figure 5B:
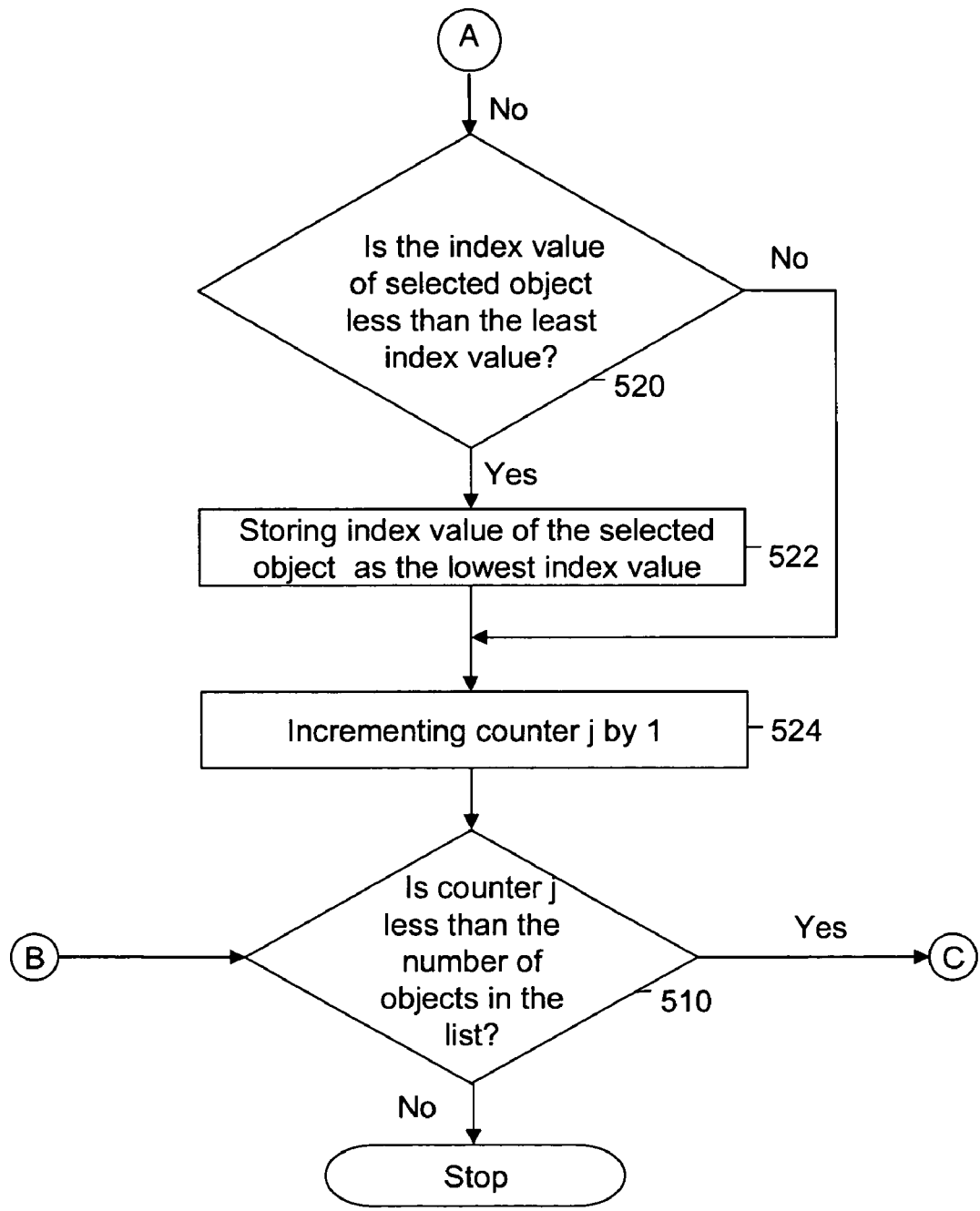

FIG. 5 is a flowchart 500 illustrating the process of selecting the least index key 'lk' in accordance with various embodiments of the invention. At step 502, a counter j is initialized to zero. The counter j stores the position of an object that is to be selected from list 206. At step 504, a check is performed to compare the type of an object stored at the position denoted by counter j with the type of the object described in the predefined input 'D'. If the object at the position denoted by counter j is associated with a type identical to the type of the object described in the predefined input 'D', then the object is selected for storing in the database at step 506. If the object at the position denoted by counter j is not associated with a type identical to the type of the object described in the predefined input 'D', then the counter j increments by one at step 508 to enable checking a subsequent object in list 206.

The condition may be expressed as: Oi {i|1 ... Z, Z<=M} if T(O(i))=T, H ( C(O(i)), O(i)), where, T(O(i)) denotes a type of an object O(i) to be selected, C(O(i)) denotes an index key associated with the object O(i), T denotes the type of the data values defined in the predefined input 'D' and H (C(O(i)), O(i)) is a function that denotes storing each object O(i) and the associated index key C(O(i)) in the database.

A function enabling the above-mentioned condition may be represented as follows: Selected objects (keyi, valuej)= (index key, matrix [Ri, Cj]), where j=1 ... n, and i=Rr ... m.

Subsequently, a check is performed to compare the counter j with the number of objects in list 206 at step 510. If the counter j is greater than the number of objects in list 206, the process is terminated; otherwise, flowchart 500 is redirected to step 504.

If an object at the position denoted by counter j has been selected at step 506, the object and the associated index key is stored in the database at step 512. At step 514, a check is performed to find out if the object at the position denoted by counter j is the first object to be selected. If the object at the position denoted by counter j is the first object to be selected, then the index key of the object at the position denoted by counter j is initialized as the least index key 'lk' at step 516. At step 518, the counter j is incremented to enable selection of the subsequent object in list 206. Thereafter, flowchart 500 is redirected to step 510.

If there is another object to be selected from list 206, flowchart 500 is directed to step 520. At step 520, a check is performed to find out if the index key of the subsequently selected object is less than the least index key 'lk'. If the index key of the subsequently selected object is less than the least index key 'lk', the least index key 'lk' is assigned the index key of the subsequently selected object at step 522. Otherwise, the counter j increments by one at step 524. Flowchart 500 is then directed to step 510. This method enables storing the least of the plurality of index keys in the database as the least index key 'lk'.

The process of selecting the least index key 'lk' may also be expressed as: lk=C(O(0)), O(i) {I|1 ... Z, Z<=M} if lk>C(O(i)), lk=C(O(i)).

A function enabling the same may be represented as: least index key 'lk'=Least index key among selected objects [keyi, valuej], where i=row reference 'Rr' ... m, j=1 ... n. Therefore, the method described by flowchart 500, ensures that the least index key 'lk' is assigned the least of the plurality of index keys in the database, also referred to as hash table.

Figure 6:
FIG. 6 depicts an exemplary database that stores selected objects and associated index keys, in accordance with various embodiments of the invention.

FIG. 6 depicts an exemplary database that stores objects selected from list 206 and the associated index keys, in accordance with various embodiments of the invention. In an embodiment, the database may be referred to as a hash table. For example, hash table 600, stores a set of selected objects and the associated index keys. In an exemplary illustration of the invention, consider the predefined input 'D' to include data values corresponding to object O(4). In an embodiment of the invention, when textual representation matrix 204 is traversed, the following is determined:

Row reference 'Rr'=3, as row 2 includes null values, and row 3 is the first row including non null data.

Row number of the selected row 'Rj'=7, as the data values of row 7 correspond to the data value associated with object O(4) in textually represented matrix 204.

Reference index 'Ri'=Rj−Rr=7−3=4

In an exemplary embodiment, let the least index key be associated with O(0) and be assigned a value of 1. Accordingly, the unique index key 'Ci' is calculated as: unique index key 'Ci'=4+1=5. According to the method of the invention, an object with 'Ci' equal to 5, is searched for in hash table 600. Accordingly, the search results in O(4) having an index key equal to 5 being located.

Embodiments of the present invention is further explained by the following set forth example which is being given by way of illustration only and not by way of any limitation. All parameters in the example are not to be construed to unduly limit the scope of the invention.

FIG. 7 illustrates a matrix representation 702 and a matrix representation 704 of an exemplary set of objects present in a GUI, in accordance with various embodiments of the invention. Matrix representation 702 is a textual representation of the set of objects, which are stored in a column 706 in matrix representation 702. The set of objects stored in the rows of matrix representation 702 may be GUITestObjects® that can be represented by the XDE Tester® Tool.

In an exemplary embodiment, matrix representation 702 stores objects with the corresponding locations and products. For example, a column 708 stores a location corresponding to each of the set of objects stored in column 706, while column 710 stores a corresponding product. A column 712 and a column 714 are null columns that do not store any value. Optionally, column 712 and column 714 may store additional fields corresponding to the set of objects in column 706.

The execution of the method of the invention may be understood by a real world example. Consider a case wherein a circuit connection of a product is to be set up in a city. In an embodiment of the invention, in order to locate an object associated with a location 'Santa Clara', present in column 708 and a product 'Product 2' present in column 710, the methodology as described with reference to FIG. 4 can be carried out.

The row reference 'Rr' is identified in matrix representation 702 and is computed to be row 3, as row 3 contains the first non-null data value in matrix representation 702. Thereafter, the least index key 'lk' is identified as 'X'.

Thereafter, the selected row 'Rj' is identified as the row including 'SantaClara' and 'Product 2' and is therefore equal to row 7. Subsequently, the reference index 'Ri' is calculated as the difference between the selected row 'Rj' and the row reference 'Rr'. Reference index 'Ri' is computed to be equal to 4, as the difference between the selected row 'ROj' and the row reference 'Rr'.

Finally, the least index key 'lk' is added to the reference index 'Ri' to determine a unique index key 'Ci'. Therefore, the unique index key 'Ci' is computed to be equal to X+4, where X is the least index key 'lk' and 4 is the reference index 'Ri'. The unique index key 'Ci' is thus used to identify the object corresponding to 'Santa Clara' and 'Product 2' from a hash table as described in conjunction with FIG. 6.

Figure 8:
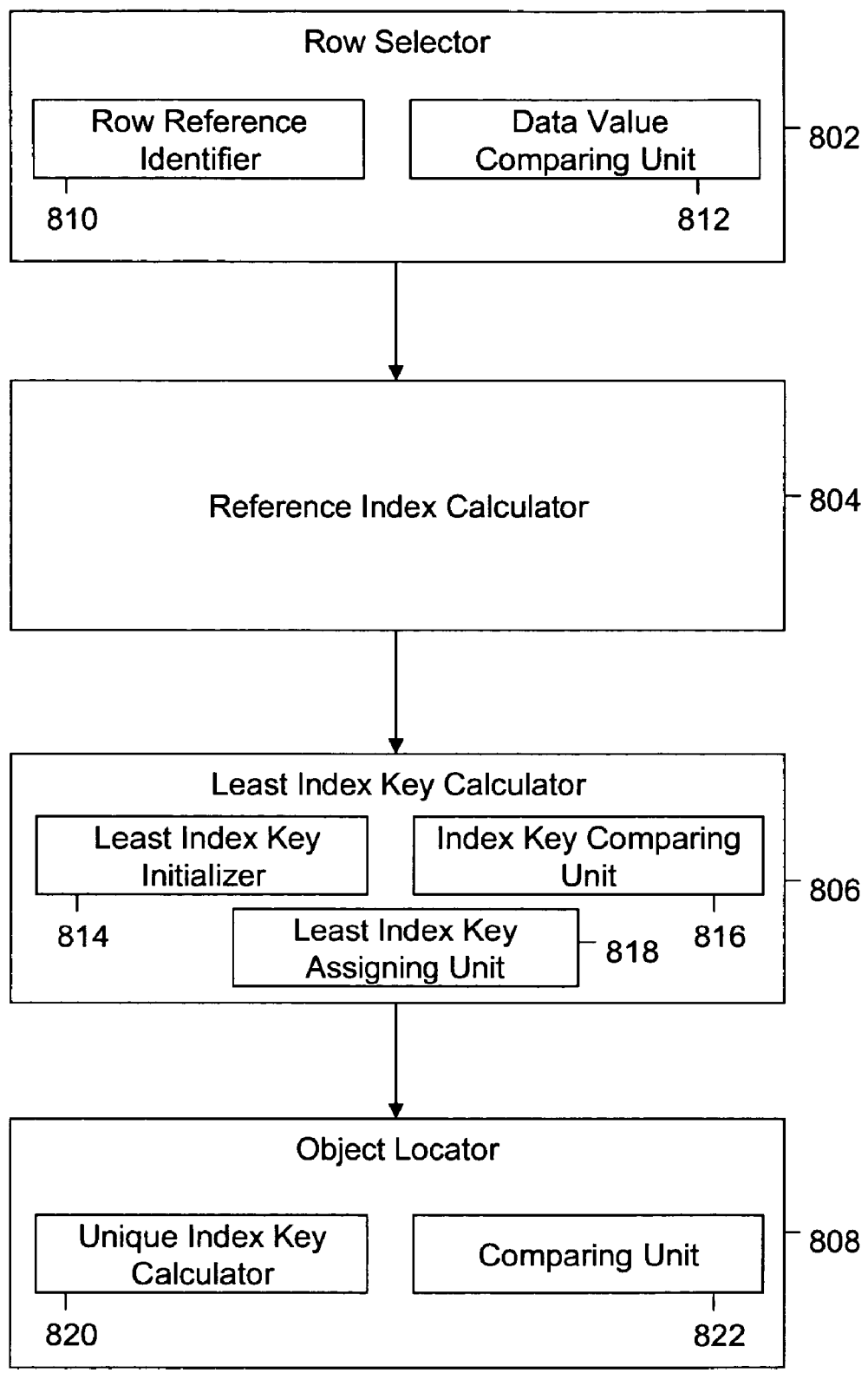
FIG. 8 illustrates a block diagram of a system for selecting a dynamic object in a GUI, in accordance with various embodiments of the invention.

FIG. 8 illustrates a block diagram of a system in accordance with various embodiments of the invention. A system 800 includes a row selector 802, a reference index calculator 804, a least index key calculator 806 and an object locator 808. Row selector 802 includes a row reference identifier 810, and a data value comparing unit 812. Further, least index calculator 806 includes a least index key initializer 814, an index key comparing unit 816, and a least index key assigning unit 818. Additionally, object locator 808 includes a unique index key calculator 820, and a comparing unit 822.

System 800 identifies the object in the following manner. Row selector 802 identifies the selected row 'Rj' which includes an object whose associated plurality of data values is identical to the data values specified for an object in the predefined input 'D'. Row reference identifier 810, identifies the row reference 'Rr' in textually represented matrix 204. Data value comparing unit 812 then uses the row reference 'Rr' as a starting point and compares each of the plurality of data values associated with each object in the rows starting from the row reference 'Rr', with the predefined input 'D', as has been described with reference to FIG. 4. Row reference identifier 810 and data value comparing unit 812 enable row selector 802 to select the row 'Rj' in textually represented matrix 204, whose associated plurality of data values is identical to the data values specified for an object in the predefined input 'D'.

Thereafter, reference index calculator 804 computes the reference index 'Ri' as the difference in the number of rows between the selected row 'Rj' and the row reference 'Rr' according to the method described with reference to FIG. 4.

According to the method described with reference to FIG. 4, objects associated with a type identical to the type of the object described in the predefined input 'D' are selected from list 206. In various embodiments of the invention, an object storing unit stores selected objects and the index key associated with each selected object in hash table 600, from where a dynamic object is later selected.

Least index key calculator 806 calculates the least index key 'lk' from the plurality of index keys corresponding to each selected object in hash table 600, according to the method described with reference to FIG. 5. Least index key initializer 814 assigns the index key of the first selected object to be stored in hash table 600 as the least index key 'lk'. Index key comparing unit 816 compares the index key of each subsequently selected object that is to be stored in hash table 600 with the least index key 'lk'. Least index key assigning unit 818 stores the lesser of the values between the least index key 'lk' and the index key of the object to be stored in hash table 600. Index key comparing unit 816 and least index key assigning unit 818, enable storing the least of the plurality of index keys as the least index key 'lk'.

Thereafter, object locator 808 locates an object from hash table 600, according to the method described with reference to FIG. 4. Unique index key calculator 820 computes the unique index key 'Ci', by adding the least index key 'lk' to the reference index 'Ri'. The unique index key 'Ci' is then compared with each of the plurality of index keys in hash table 600 by comparing unit 822. Therefore, an object whose associated index key is equal to the unique index key 'Ci' is selected from hash table 600.

Embodiments of the present invention have the advantage that a dynamically generated object can be selected in GUI 100. The embodiments of the invention provide a generic mathematical model correlating an object to be located in GUI 100 with its corresponding textual representation. Further, embodiments of the invention provide a method that performs the selection without a fixed script. Additionally, various embodiments of the invention also provide a generalized method for search and selection of objects created by various application data.

Although the invention has been discussed with respect to specific embodiments thereof, these embodiments are merely illustrative, and not restrictive, of the invention. For example, a 'method for generating a dynamic object' can include any type of analysis, manual or automatic, to anticipate the needs of object selection in various kinds of GUI.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Also in the description herein for embodiments of the present invention, a portion of the disclosure recited in the specification contains material, which is subject to copyright protection. Computer program source code, object code, instructions, text or other functional information that is executable by a machine may be included in an appendix, tables, figures or in other forms. The copyright owner has no objection to the facsimile reproduction of the specification as filed in the Patent and Trademark Office. Otherwise all copyright rights are reserved.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for selecting a dynamic object in a Graphical User Interface (GUI), the GUI being represented by a matrix, the matrix comprising a plurality of objects and a plurality of data values associated with each object, each object being associated with a type and a class index, the method comprising:

selecting a row reference, the row reference being the first row of a subset matrix in a textually represented matrix derived from the matrix, the row reference including a first non null data value in the textually represented matrix;

selecting a row in the subset matrix based on a predefined input;

calculating the difference in the number of rows between the selected row and the row reference;

selecting a least index key from a plurality of index keys, each index key identifying each of a plurality of selected objects, each of the plurality of selected objects being chosen from the objects in the matrix using the predefined input; and locating an object from the plurality of selected objects using the least index key and the difference in the number of rows between the selected row and the row reference.

2. The method according to claim 1, wherein selecting the row in the subset matrix based on the predefined input comprises comparing the predefined input with the plurality of data values associated with each of the plurality of objects included in the subset matrix.

3. The method according to claim 1, wherein the plurality of selected objects is associated with a type identical to the type of an object described in the predefined input.

4. The method according to claim 1, wherein each of the plurality of index keys is generated from a corresponding class index associated with each of the plurality of selected objects.

5. The method according to claim 1, wherein selecting the least index key comprises:

assigning the index key of a first selected object as the least index key;

comparing the index key of each subsequently selected object with the least index key; and assigning the index key of the subsequently selected object to the least index key if the least index key is greater than the index key of the subsequently selected object, wherein the comparing and the assigning are performed iteratively for each subsequently selected object.

6. The method according to claim 1, wherein locating the object from the plurality of selected objects comprises:

determining a unique index key by adding the least index key to the difference in the number of rows between the selected row and the row reference;

comparing the unique index key with each of the plurality of index keys; and identifying an object from the plurality of selected objects, the identified object being associated with an index key equal to the unique index key.

7. The method according to claim 1, further comprising generating each of the plurality of index keys during runtime.

8. A computer system for selecting a dynamic object in a Graphical User Interface (GUI), the computer system including a processor, the GUI being represented by a matrix comprising a plurality of objects and a plurality of data values associated with each object, each object being associated with a type and a class index, the system comprising:

means for selecting a row reference, the row reference being the first row of a subset matrix in a textually represented matrix derived from the matrix, the row reference including a first non null data value in the textually represented matrix;

means for selecting a row in the subset matrix based on a predefined input;

means for calculating the difference in the number of rows between the selected row and the row reference;

means for selecting a least index key from a plurality of index keys, each index key identifying each of a plurality of selected objects, each of the plurality of selected objects being chosen from the objects in the matrix using the predefined input; and means for locating an object from the plurality of selected objects using the least index key and the difference in the number of rows between the selected row and the row reference.

9. A computer system for selecting a dynamic object in a Graphical User Interface (GUI), the computer system including a processor, the GUI being represented by a matrix comprising a plurality of objects and a plurality of data values associated with each object, each object being associated with a type and a class index, the system comprising:

a row selector for selecting a row in a textually represented matrix derived from the matrix, the selection being performed based on a predefined input;

a reference index calculator for calculating the difference between rows in the textually represented matrix;

a least index key calculator for selecting the least index key from a plurality of index keys, each index key identifying each of a plurality of selected objects, each of the plurality of selected objects being chosen from the matrix using the predefined input; and an object locator for locating an object from the plurality of selected objects using the least index key and the difference in the number of rows between the selected row and the row including the first non null data value.

10. The computer system according to claim 9, wherein the row selector comprises:

a row reference identifier for selecting a row reference, the row reference comprising a first non null data value in a textually represented matrix derived from the matrix, the row reference being the first row of a subset matrix in the textually represented matrix; and a data value comparing unit for comparing the predefined input with the plurality of data values associated with each of the plurality of objects in the subset matrix.

11. The computer system according to claim 9, wherein the least index key calculator comprises:

a least index key initializer for assigning the least index key as the index key of a first selected object;

an index key comparing unit for comparing the index key of each subsequently selected object with the least index key; and a least index key assigning unit for assigning the index key of each subsequently selected object to the least index key if the least index key is greater than the index key of the subsequently selected object.

12. The computer system according to claim 9, wherein the object locator comprises:

a unique index key calculator for calculating a unique index key by adding the least index key to the reference index; and an index key comparing unit for comparing the unique index key with each of the plurality of index keys.

13. A machine-readable storage medium including instructions executable by the processor for selecting a dynamic object in a Graphical User Interface (GUI), the GUI being represented by a matrix, the matrix comprising a plurality of objects and a plurality of data values associated with each object, each object being associated with a type and a class index, the machine-readable medium comprising:

one or more instructions for selecting a row reference, the row reference being the first row of a subset matrix in a textually represented matrix derived from the matrix, the row reference including a first non null data value in the textually represented matrix;

one or more instructions for selecting a row in the subset matrix based on a predefined input;

one or more instructions for calculating the difference in the number of rows between the selected row and the row reference;

one or more instructions for selecting a least index key from a plurality of index keys, each index key identifying each of a plurality of selected objects, each of the plurality of selected objects being chosen from the objects in the matrix using the predefined input; and one or more instructions for locating an object from the plurality of selected objects using the least index key and the difference in the number of rows between the selected row and the row reference.

14. The machine-readable storage medium of claim 13 wherein the one or more instructions for selecting the least index key comprises:

one or more instructions for assigning the index key of a first selected object as the least index key;

one or more instructions for comparing the index key of each subsequently selected object with the least index key; and one or more instructions for assigning the index key of the subsequently selected object to the least index key if the least index key is greater than the index key of the subsequently selected object, wherein the comparing and the assigning are performed iteratively for each subsequently selected object.

* * * * *